(12) United States Patent
Suzuki et al.

(10) Patent No.: US 12,485,956 B2
(45) Date of Patent: Dec. 2, 2025

(54) ELECTRIC POWER STEERING DEVICE

(71) Applicant: Hitachi Astemo, Ltd., Hitachinaka (JP)

(72) Inventors: Toshinobu Suzuki, Hitachinaka (JP); Osamu Yoshida, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 455 days.

(21) Appl. No.: 18/024,880

(22) PCT Filed: Aug. 17, 2021

(86) PCT No.: PCT/JP2021/029986
§ 371 (c)(1),
(2) Date: Mar. 6, 2023

(87) PCT Pub. No.: WO2022/050037
PCT Pub. Date: Mar. 10, 2022

(65) Prior Publication Data
US 2023/0311976 A1 Oct. 5, 2023

(30) Foreign Application Priority Data
Sep. 7, 2020 (JP) .................................. 2020-149549

(51) Int. Cl.
*B62D 5/04* (2006.01)
(52) U.S. Cl.
CPC .......... *B62D 5/0454* (2013.01); *B62D 5/0421* (2013.01)
(58) Field of Classification Search
CPC ...... B62D 5/0454; B62D 5/0421; B62D 3/12; B62D 5/0403
See application file for complete search history.

(56) References Cited

U.S. PATENT DOCUMENTS

| 2006/0054378 A1* | 3/2006 | Tanaka | B62D 5/0424 180/444 |
| 2012/0233860 A1* | 9/2012 | Yoneda | B62D 5/0409 29/893.1 |

(Continued)

FOREIGN PATENT DOCUMENTS

| JP | 2013-193704 A | 9/2013 |
| JP | 2020-040599 A | 3/2020 |
| WO | WO-2023042552 A1 * | 3/2023 ............ F16H 19/04 |

OTHER PUBLICATIONS

International Preliminary Report on Patentability dated Mar. 7, 2023 issued in International Patent Application No. PCT/JP2021/029986, with English translation, 7 pages.

(Continued)

*Primary Examiner* — Paul N Dickson
*Assistant Examiner* — Matthew D Lee
(74) *Attorney, Agent, or Firm* — FOLEY & LARDNER LLP

(57) ABSTRACT

An electric power steering device including a first bolt boss of a second housing provided on a first housing side relative to a worm-wheel accommodating portion of the second housing, and has a first female thread portion open on the first housing side and located within a plane area defined by connecting a second pinion shaft, a first bracket hole, and a second bracket hole; and a first bolt boss of the first housing provided to the first housing to be opposed to the first bolt boss of the second housing, and has a first bolt hole located within the plane area defined by connecting the second pinion shaft, the first bracket hole, and the second bracket hole and being formed through the first housing to be continuous with the first female thread portion of the first bolt boss of the second housing.

10 Claims, 5 Drawing Sheets

(56) References Cited

U.S. PATENT DOCUMENTS

| | | | |
|---|---|---|---|
| 2013/0180794 A1* | 7/2013 | Shiino | B62D 5/0409 |
| | | | 180/444 |
| 2013/0248278 A1* | 9/2013 | Ishii | B62D 5/0421 |
| | | | 74/606 R |
| 2016/0068184 A1* | 3/2016 | Kimoto | B62D 7/226 |
| | | | 180/444 |
| 2018/0087982 A1* | 3/2018 | Arimura | C25D 5/36 |
| 2019/0016372 A1* | 1/2019 | Kimura | B62D 5/0454 |
| 2021/0001917 A1* | 1/2021 | Guerin | B62D 3/04 |
| 2023/0399047 A1* | 12/2023 | Sung | B62D 5/0454 |

OTHER PUBLICATIONS

International Search Report dated Nov. 9, 2021 issued in International Application No. PCT/JP2021/029986, with English translation, 7 pages.

* cited by examiner

ELECTRIC POWER STEERING DEVICE

TECHNICAL FIELD

The present invention relates to an electric power steering device.

BACKGROUND ART

In Patent Literature 1, there is disclosed an electric power steering device including a first housing, a second housing, second bolt bosses, first bolt bosses, and bolts. The first housing accommodates at least a part of a rack bar and at least a part of a pinion shaft. The second housing includes a worm-wheel accommodating portion that accommodates a worm wheel. The second bolt bosses are formed in the second housing so as to be closer to the first housing than the worm-wheel accommodating portion. Each of the second bolt bosses has a female thread portion being open on the first housing side. The first bolt bosses are formed in the first housing so as to be opposed to the second bolt bosses. The first bolt bosses have bolt holes that are formed through the first housing so as to be continuous with the female thread portions of the second bolt bosses, respectively. The bolts are inserted from the first bolt boss side toward the second bolt boss side and fasten the first housing and the second housing together.

CITATION LIST

Patent Literature

PTL 1: JP 2013-193704 A

SUMMARY OF INVENTION

Technical Problem

However, a size of the electric power steering device disclosed in Patent Literature 1 in a radial direction cannot be reduced. As a result, it may become difficult to place the first housing and the second housing in a limited small space.

One object of the present invention is to provide an electric power steering device, which can be reduced in size in a radial direction, and includes a first housing and a second housing that can be arranged in a limited small space.

Solution to Problem

In order to achieve the above-mentioned object, according to a preferred aspect of the present invention, there is provided an electric power steering device for applying a steering force to steered wheels, including: a first pinion shaft to which a rotational force of a steering wheel is transmitted; a rack bar having first rack teeth to be meshed with the first pinion shaft and second rack teeth different from the first rack teeth; a second pinion shaft to be meshed with the second rack teeth; a worm wheel provided around the second pinion shaft; a worm shaft to be meshed with the worm wheel; an electric motor, which is provided to the worm shaft and is configured to generate the steering force to be applied to the steered wheels; a first housing including: a rack-bar accommodating portion configured to accommodate at least a part of the rack bar; a second pinion-shaft accommodating portion configured to accommodate at least a part of the second pinion shaft; and a bracket portion including a first bracket portion and a second bracket portion, each extending outward from the rack-bar accommodating portion with respect to the rack bar, the first bracket portion having a first bracket hole configured to allow mounting to a mounted member, and the second bracket portion having a second bracket hole configured to allow mounting to the mounted member; a second housing including a worm-wheel accommodating portion configured to accommodate the worm wheel; a first bolt boss of the second housing, which is provided on the first housing side with respect to the worm-wheel accommodating portion of the second housing and has a first female thread portion, the first female thread portion being open on the first housing side and being formed so as to be located within a plane area defined by connecting the second pinion shaft, the first bracket hole, and the second bracket hole; and a first bolt boss of the first housing, which is provided to the first housing so as to be opposed to the first bolt boss of the second housing and has a first bolt hole, the first bolt hole being formed so as to be located within the plane area defined by connecting the second pinion shaft, the first bracket hole, and the second bracket hole and being formed through the first housing so as to be continuous with the first female thread portion of the first bolt boss of the second housing.

Thus, according to the preferred aspect of the present invention, a size in a radial direction can be reduced, and a first housing and a second housing can be arranged in a limited small space.

DESCRIPTION OF EMBODIMENTS

First Embodiment

Figure 1:
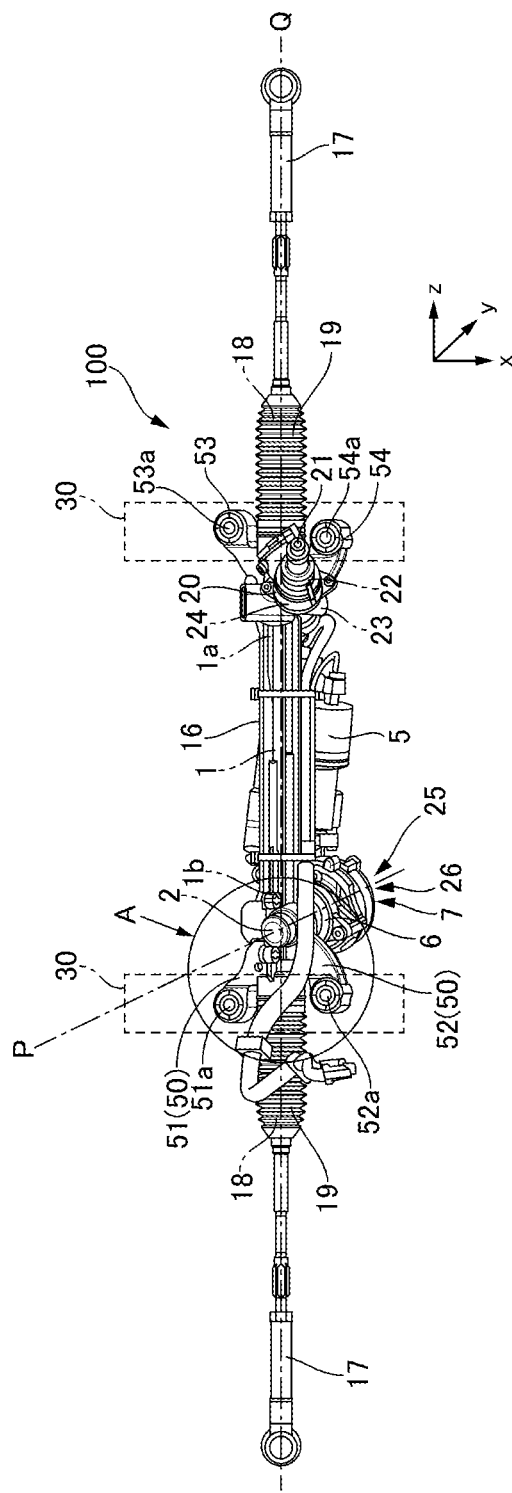
FIG. 1 is a view for illustrating an overall configuration of an electric power steering device according to a first embodiment.

FIG. 1 is a view for illustrating an overall configuration of an electric power steering device according to a first embodiment.

For description, an x-axis, a y-axis, and a z-axis are defined.

A direction orthogonal to a rack bar 1 is referred to as an x-axis direction, and a downward direction of FIG. 1 is referred to as a positive direction. A direction in which a rotation axis P of a second pinion shaft 2 extends is referred to as a y-axis direction, and a downward direction of FIG. 1 is referred to as a positive direction. Further, a direction in which a center axis Q of the rack bar 1 extends is referred to as a z-axis direction, and a rightward direction of FIG. 1 is referred to as a positive direction.

[Overall Configuration of Electric Power Steering Device]

As illustrated in FIG. 1, an electric power steering device 100 includes a rack housing 16 extending in a right-and-left direction of a vehicle. The rack bar 1 is accommodated in the rack housing 16 so as to be slidable in the right-and-left direction of the vehicle. End portions of the rack bar 1 project beyond opening portions of the rack housing 16 at both ends. A tie rod 17 is connected to each of the end portions through intermediation of a joint 18. The end portions of the rack bar 1, the joints 18, and vicinities of end portions of the tie rods 17 on the joint 18 side are covered with boots 19, respectively. The movement of the rack bar 1 moves the tie rods 17, and steered wheels are steered through intermediation of steering mechanisms (not shown) connected to the tie rods 17, respectively.

A steering gear housing 20 is provided on one end side (right side of FIG. 1) of the rack housing 16. An input shaft 21, which is coupled to a steering wheel, is rotatably axially supported in the steering gear housing 20. The input shaft 21 is connected to a first pinion shaft 23 through intermediation of a torsion bar 22 so that the input shaft 21 and the first pinion shaft 23 are rotatable relative to each other.

A torque sensor 24 is provided on an outer peripheral side of the input shaft 21. The torque sensor 24 detects a steering torque, which is input by a driver to the steering wheel, based on a relative rotation amount between the input shaft 21 and the first pinion shaft 23.

The first pinion shaft 23 is meshed with first rack teeth 1a formed on one end side of the rack bar 1 and transmits the steering torque, which is input to the steering wheel, to the rack bar 1.

Further, the steering gear housing 20 includes a third bracket portion 53 and a fourth bracket portion 54. The third bracket portion 53 has a third bracket hole 53a that allows mounting to a frame (mounted member) 30 of the vehicle and extends outward in an x-axis negative direction. The fourth bracket portion 54 has a fourth bracket hole 54a that allows mounting to the frame (mounted member) 30 of the vehicle and extends outward in an x-axis positive direction.

A reduction gear housing 25 is provided on another end side (left side of FIG. 1) of the rack housing 16. The reduction gear housing 25 includes a first housing 6 and a second housing 7.

A power steering mechanism 26 is accommodated in the reduction gear housing 25. The power steering mechanism 26 outputs an auxiliary steering torque generated by an electric motor 5 in response to the steering torque input by the driver to the steering wheel.

Further, the first housing 6 of the reduction gear housing 25 includes a first bracket portion 51 and a second bracket portion 52. The first bracket portion 51 has a first bracket hole 51a configured to allow mounting to the frame (mounted member) 30 of the vehicle and extends outward in the x-axis negative direction. The second bracket portion 52 has a second bracket hole 52a configured to allow mounting to the frame (mounted member) 30 of the vehicle and extends outward in the x-axis positive direction.

The power steering mechanism 26 includes a worm shaft 4, a worm wheel 3, and the second pinion shaft 2, which are described later in detail. The worm shaft 4 is connected to an output shaft of the electric motor 5. The worm wheel 3 is meshed with the worm shaft 4. The second pinion shaft 2 rotates together with the worm wheel 3.

The second pinion shaft 2 is meshed with second rack teeth 1b formed on another end side of the rack shaft and transmits a motor torque, which has been input from the electric motor 5, to the rack bar 1.

Figure 2:
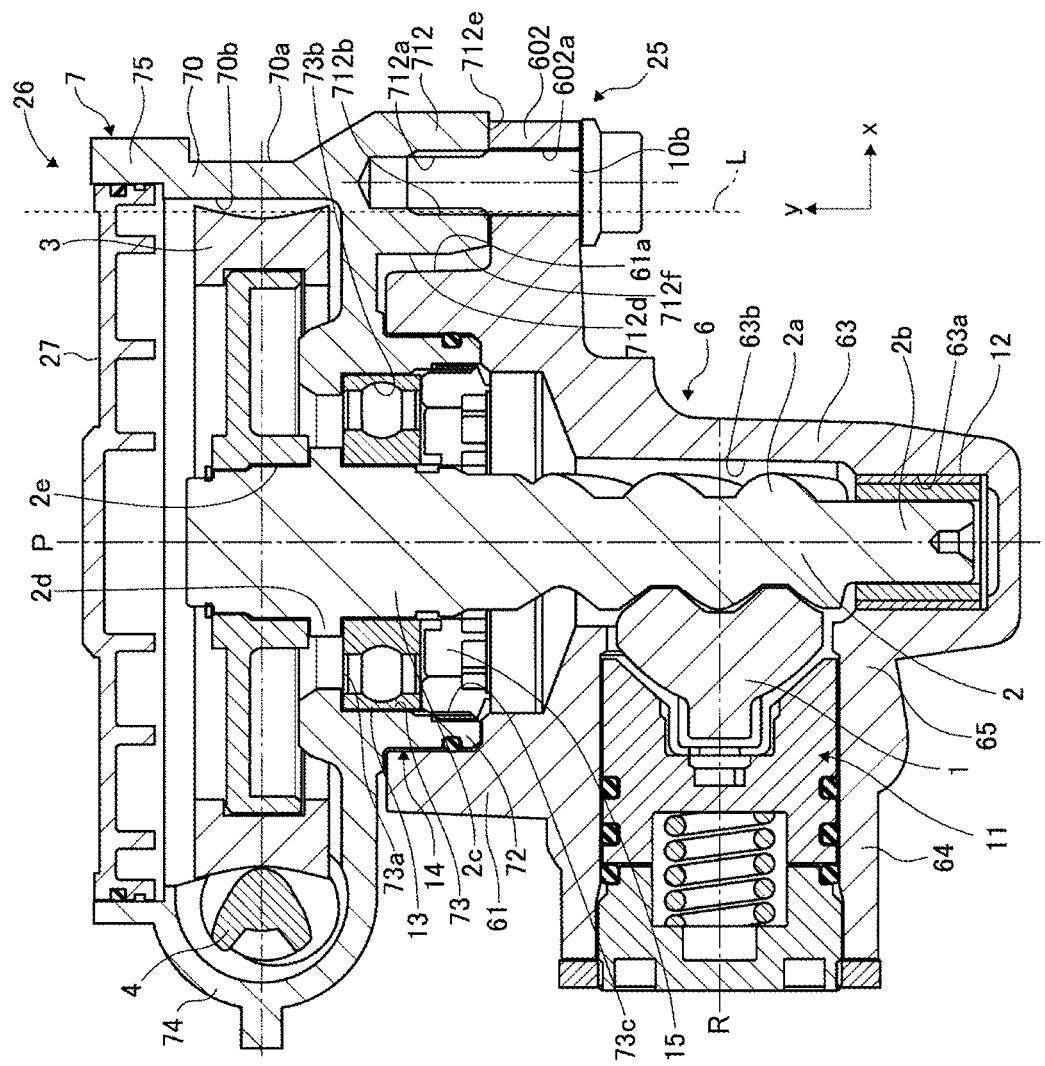
FIG. 2 is a sectional view of a power steering mechanism in the first embodiment.

FIG. 2 is a sectional view of the power steering mechanism in the first embodiment.

[Configuration of Power Steering Mechanism]
(Configuration of Second Pinion Shaft)

The second pinion shaft 2 has pinion teeth 2a on the negative side in the y-axis direction.

The second pinion shaft 2 includes a first bearing insertion portion 2b at its distal end on the negative side in the y-axis direction. The first bearing insertion portion 2b has a smaller diameter than an outer diameter of the pinion teeth 2a. The second pinion shaft 2 includes a second bearing press-fit portion 2c on the positive side in the y-axis direction with respect to the pinon teeth 2a. The second bearing press-fit portion 2c has a larger diameter than the outer diameter of the pinion teeth 2a.

The second pinion shaft 2 includes a flange portion 2d on the positive side in the y-axis direction with respect to the second bearing press-fit portion 2c. The flange portion 2d has a larger diameter than the diameter of the second bearing press-fit portion 2c.

The second pinion shaft 2 includes a worm-wheel fitting portion 2e on the positive side in the y-axis direction with respect to the flange portion 2d. The worm-wheel fitting portion 2e has a smaller diameter than the diameter of the flange portion 2d.

(Configuration of Second Housing)

The second housing 7 has a hollow shape and includes a worm-wheel accommodating portion 70 in the vicinity of a center portion in the y-axis direction. The worm-wheel accommodating portion 70 is formed so that an inner peripheral surface 70b has a larger diameter than a diameter of the worm wheel 3.

A worm-shaft accommodating portion 74 is formed on the negative side in the x-axis direction that is perpendicular to the direction in which the rotation axis P of the worm-wheel accommodating portion 70 extends, that is, perpendicular to the y-axis direction. The worm-shaft accommodating portion 74 is formed so that an inner periphery has a larger diameter than a diameter of the worm shaft 4.

A lid-member fitting portion 75 is formed on the positive side in the y-axis direction with respect to the worm-wheel accommodating portion 70. A lid member 27 is tightly fitted into the lid-member fitting portion 75. The lid-member fitting portion 75 is formed so as to have a larger diameter than a diameter of the worm-wheel accommodating portion 70.

A second bearing holding portion 73 is formed on the negative side in the y-axis direction with respect to the worm-wheel accommodating portion 70. A second bearing 13 is installed in the second bearing holding portion 73. Specifically, the second bearing 13 is installed at a position close to the worm wheel 3.

An opening portion of the second bearing holding portion 73 on the worm-wheel accommodating portion 70 side is formed so as to be substantially as large as an inner periphery of an outer race of the second bearing 13. A surface of the second bearing holding portion 73 on the negative side in the y-axis direction corresponds to a second bearing holding portion bottom surface 73a.

An inner peripheral surface of the second bearing holding portion 73 has been subjected to a surface treatment through machining and corresponds to a second bearing holding portion inner peripheral surface 73b. The second bearing holding portion 73 includes a lock-ring fitting portion 73c on the negative side in the y-axis direction.

Most part of the second bearing holding portion 73 is located on an inner periphery of a portion protruding in the y-axis negative direction with respect to the worm-wheel accommodating portion 70. An outer periphery of the protruding portion corresponds to a second cylindrical engagement portion 72. Specifically, the second cylindrical engagement portion 72 is formed so as to protrude in the y-axis negative direction, specifically, toward the first housing 6.

Three bolt bosses corresponding to a first bolt boss 711, a second bolt boss 712, and a third bolt boss 713 are formed on a radially outer side of the second bearing holding portion 73 and are arranged at three positions in a circumferential direction so as to surround the second bearing holding portion 73. The first bolt boss 711, the second bolt boss 712, and the third bolt boss 713 are formed so as to protrude independently in the y-axis negative direction, specifically, toward the first housing 6 (see FIG. 5).

A configuration of the bolt boss is described taking the second bolt boss 712 as an example.

The first bolt boss 711 and the third bolt boss 713 have the same configuration.

The second bolt boss 712 has a second female thread portion 712a that is open on the negative side in the y-axis direction. The second female thread portion 712a is formed so that its deepest portion is located on the negative side in the y-axis direction with respect to the worm-wheel accommodating portion 70.

Further, a female-thread innermost portion 712b (position indicated by the dotted line L of FIG. 2) of an inner peripheral surface of the second female thread portion 712a, which is located on a radially innermost side of the worm-wheel accommodating portion 70, is located on a radially inner side with respect to the inner peripheral surface 70b of the worm-wheel accommodating portion 70 of the second housing 7.

In other words, the female-thread innermost portion 712b (position indicated by the dotted line L of FIG. 2) of the second female thread portion 712a is located on a radially inner side with respect to an outer peripheral surface 70a of the worm-wheel accommodating portion 70 of the second housing 7.

A radially inner side surface 712d of the second bolt boss 712 is formed into a shape corresponding to a curved surface of a radially outer side surface 61a of a first cylindrical engagement portion 61 described later.

Specifically, the radially inner side surface 712d of the second bolt boss 712 is formed into a curved shape that is concentric with the radially outer side surface 61a of the first cylindrical engagement portion 61.

Further, the radially inner side surface 712d includes a tapered portion 712f. The tapered portion 712f is formed with a diameter increasing in the y-axis negative direction (so as to be inclined radially outward).

Further, a surface of the second bolt boss 712 on the negative side in the y-axis direction, in other words, an opposed surface 712e to a second bolt boss 602 of the first housing 6, which is described later, is formed so as to extend in parallel to the second bearing holding portion bottom surface 73a of the second bearing holding portion 73.

(Configuration of First Housing)

The first housing 6 includes a pinion-shaft accommodating portion 63. The pinion-shaft accommodating portion 63 is hollow and has a bottomed cup-like shape with an opening portion on the positive side in the y-axis direction and a bottom on the negative side in the y-axis direction. The first housing 6 includes a first bearing holding portion 63a on the bottom.

A pinion-teeth accommodating portion 63b having a larger diameter than a diameter of the first bearing holding portion 63a is formed on the positive side in the y-axis direction with respect to the first bearing holding portion 63a. The pinion-teeth accommodating portion 63b is formed with a larger diameter than the outer diameter of the pinon teeth 2a.

A rack-bar accommodating portion 65 is formed on the negative side of the pinion-shaft accommodating portion 63 in the x-axis direction. The rack-bar accommodating portion 65 is formed so as to extend in a twisting direction with respect to the direction in which the rotation axis P of the pinion-shaft accommodating portion 63 extends.

The pinion-shaft accommodating portion 63 and the rack-bar accommodating portion 65 communicate with each other in the vicinity of an intersection of the direction in which the rotation axis P of the pinion-shaft accommodating portion 63 extends and a direction in which a center axis R of the rack-bar accommodating portion 65 extends when viewed from the positive side in the x-axis direction.

Figure 3:
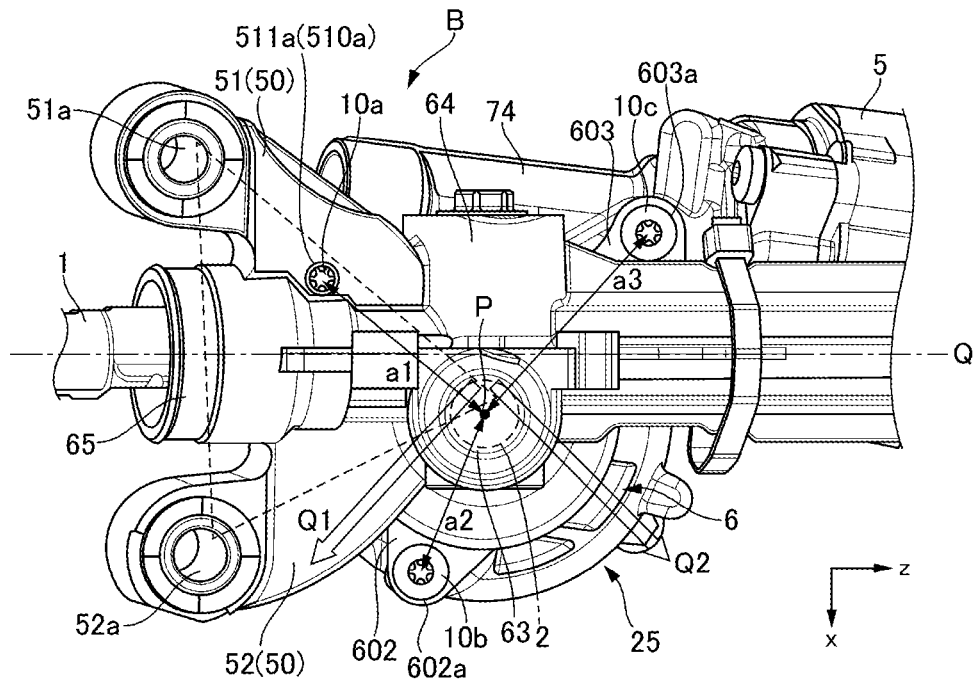
FIG. 3 is an enlarged view of an area A of FIG. 1.
Figure 4:
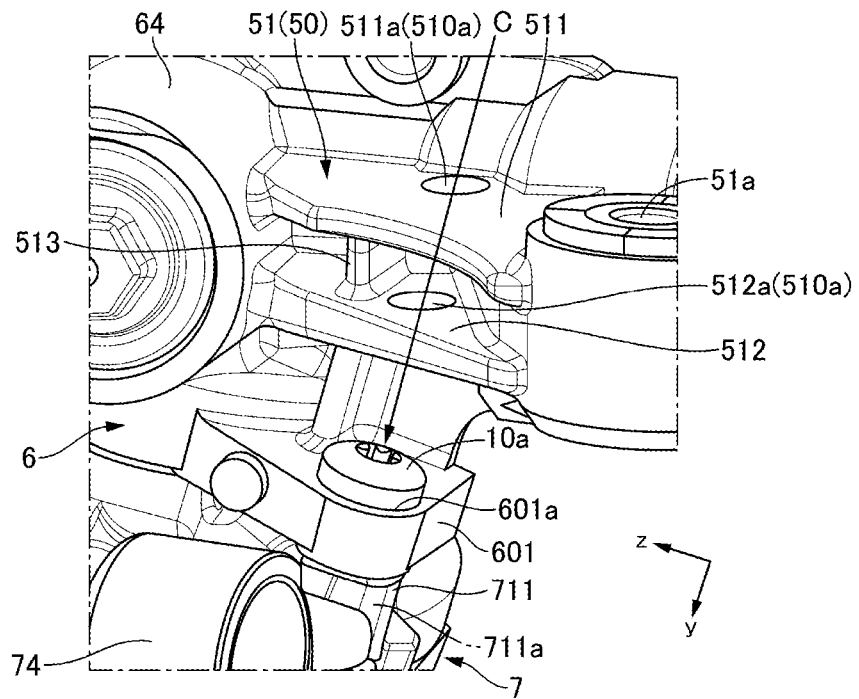
FIG. 4 is a perspective view when viewed in a direction of the arrow B of FIG. 3.

A first bolt boss 601, a second bolt boss 602, and a third bolt boss 603 are formed on the positive side in the y-axis direction with respect to the pinion-teeth accommodating portion 63b and on a radially outer peripheral side of the pinion-teeth accommodating portion accommodating portion 63 (see FIG. 3 and FIG. 4). The first bolt boss 601 has a first bolt hole 601a. The second bolt boss 602 has a second bolt hole 602a. The third bolt boss 603 has a third bolt hole 603a.

Specifically, the first bolt hole 601a of the first bolt boss 601, the second bolt hole 602a of the second bolt boss 602, and the third bolt hole 603a of the third bolt boss 603 are formed through the first housing 6 so as to be continuous with a first female thread portion 711a of the first bolt boss 711, the second female thread portion 712a of the second bolt boss 712, and a third female thread portion 713a of the third bolt boss 713 of the second housing 7, respectively.

The first cylindrical engagement portion 61 is formed on the positive side in the y-axis direction with respect to the pinion-shaft accommodating portion 63. Specifically, the first cylindrical engagement portion 61 is formed so as to protrude toward the second housing 7.

The first cylindrical engagement portion 61 is formed into an annular shape so as to protrude from the pinion-shaft accommodating portion 63. The first cylindrical engagement portion 61 is formed so that its inner periphery has a diameter slightly larger than an outer diameter of the second cylindrical engagement portion 72 of the second housing 7.

(Mounting to Reduction Gear Housing)

The second bearing 13 is inserted into the second bearing holding portion 73 from the negative side of the second housing 7 in the y-axis direction. At this time, an outer race of the second bearing holding portion 73 is brought into abutment against the second bearing holding portion bottom surface 73a. A lock ring 15 is fitted into the lock-ring fitting portion 73c.

The lock ring 15, which is in a fitted state, is brought into abutment against the outer race of the second bearing 13. The second bearing 13 is held between the second bearing holding portion bottom surface 73a and the lock ring 15.

The worm wheel 3 has a through hole in its center. The worm-wheel fitting portion 2e of the second pinion shaft 2 is press-fitted into the through hole.

The second pinion shaft 2, to which the worm wheel 3 is mounted, is inserted from a distal end of the second bearing 13 on the positive side in the y-axis direction into the second bearing 13 mounted in the second housing 7.

The worm wheel 3 is accommodated in the worm-wheel accommodating portion 70 of the second housing 7 under a state in which the flange portion 2*d* of the second pinion shaft 2 and an inner race of the second bearing 13 are in abutment against each other.

Further, the worm shaft 4 is inserted into the worm-shaft accommodating portion 74 of the second housing 7 and is meshed with the worm wheel 3.

The lid member 27 is fitted into the lid-member fitting portion 75 to thereby close an opening portion of the second housing 7 on the positive side in the y-axis direction.

The first bearing 12 is press-fitted into the first bearing holding portion 63*a* from the positive side of the first housing 6 in the y-axis direction.

The second pinion shaft 2, which is mounted in the second housing 7, is inserted into the pinion-shaft accommodating portion 63 of the first housing 6. At this time, an outer periphery of the second cylindrical engagement portion 72 of the second housing 7 is fitted into the inner periphery of the first cylindrical engagement portion 61 of the first housing 6.

The first cylindrical engagement portion 61 and the second cylindrical engagement portion 72 form a spigot joint portion 14.

The spigot joint portion 14 is arranged so as to overlap the first female thread portion 711*a* of the first bolt boss 711, the second female thread portion 712*a* of the second bolt boss 712, and the third female thread portion 713*a* of the third bolt boss 713 of the second housing 7 in the y-axis direction.

The first bearing insertion portion 2*b* of the second pinion shaft 2 is inserted into the first bearing 12. After the insertion, the pinion teeth 2*a* are accommodated in the pinion-teeth accommodating portion 63*b*.

Further, the rack bar 1 is accommodated in the rack-bar accommodating portion 65 of the first housing 6 and is meshed with the pinion teeth 2*a*.

A rack retainer 11 is accommodated in a retainer accommodating portion 64, and the rack bar 1 is pressed toward the second pinion shaft 2 by the rack retainer 11.

Bolts 10*a*, 10*b*, and 10*c* are inserted into the first bolt hole 601*a* of the first bolt boss 601, the second bolt hole 602*a* of the second bolt boss 602, and the third bolt hole 603*a* of the third bolt boss 603 and are threadably engaged with the first female thread portion 711*a* of the first bolt boss 711, the second female thread portion 712*a* of the second bolt boss 712, and the third female thread portion 713*a* of the third bolt boss 713 of the second housing 7. As a result, the first housing 6 and the second housing 7 are fastened and fixed together.

FIG. 3 is an enlarged view of an area A of FIG. 1, and FIG. 4 is a perspective view when viewed in a direction indicated by the arrow B of FIG. 3.

As illustrated in FIG. 3, the first bracket portion 51 and the second bracket portion 52 are arranged on the opposite sides with respect to the center axis Q of the rack bar 1 and are formed integrally with the first housing 6.

Further, the first bracket portion 51 is arranged so as to overlap the first bolt boss 601 of the first housing 6 and the first bolt boss 711 of the second housing 7 in the y-axis direction. The first bracket portion 51 is opposed to the first bolt boss 601 and the first bolt boss 711.

Further, as illustrated in FIG. 4, the first bracket portion 51 includes two plate-shaped portions corresponding to a first plate-shaped portion 511 and a second plate-shaped portion 512 that are arranged so as to be spaced apart from each other in the y-axis direction.

Further, a rib 513 that couples the first plate-shaped portion 511 and the second plate-shaped portion 512 is formed at a position avoiding through holes 510*a* described later.

In this manner, the formation of a cavity in molding can be prevented.

Further, strength of the first plate-shaped portion 511 and the second plate-shaped portion 512 can be improved, and the rib 513 and the through holes 510*a* can be prevented from interfering with each other.

The first plate-shaped portion 511 and the second plate-shaped portion 512 respectively have a first through hole 511*a* and a second through hole 512*a*, which correspond to the through holes 510*a*. The first through hole 511*a* and the second through hole 512*a* are formed at positions in alignment with the first bolt hole 601*a* of the first bolt boss 601 of the first housing 6 and the first female thread portion 711*a* of the first bolt boss 711 of the second housing 7 in the y-axis direction, specifically, at positions facing the first bolt hole 601*a* and the first female thread portion 711*a*. The first plate-shaped portion 511 and the second plate-shaped portion 512 are opposed to the first bolt boss 601 and the first bolt boss 711.

As indicated by the arrow C of FIG. 4, this configuration allows the first bolt 10*a*, which passes through the first bolt hole 601*a* of the first bolt boss 601 of the first housing 6, to easily be threadably engaged with the first female thread portion 711*a* of the first bolt boss 711 of the second housing 7 with use of a mounting tool inserted through the first through hole 511*a* and the second through hole 512*a* from an outside on the negative side in the y-axis direction.

Specifically, the first housing 6 and the second housing 7 can be fastened and fixed together without being obstructed by the first bracket portion 51 that is arranged so as to overlap the first bolt boss 601 of the first housing 6 and the first bolt boss 711 of the second housing 7 in the y-axis direction. The first bracket portion 51 is opposed to the first bolt boss 601 and the first bolt boss 711.

Further, as illustrated in FIG. 3, the first bolt hole 601*a* of the first bolt boss 601 of the first housing 6, the first female thread portion 711*a* of the first bolt boss 711 of the second housing 7, the first through hole 511*a* of the first plate-shaped portion 511, and the second through hole 512*a* of the second plate-shaped portion 512, which are in alignment with each other so as to be continuous in the y-axis direction, are formed so as to be located within a plane area defined by connecting a point in the first bracket hole 51*a* of the first bracket portion 51, a point in the second bracket hole 52*a* of the second bracket portion 52, and a point in the second pinion shaft 2.

Thus, a size in a radial direction can be reduced, and the first housing 6 and the second housing 7 can be arranged in a limited small space.

Further, as illustrated in FIG. 3, a relationship among a distance a1, a distance a2, and a distance a3 is set to: a2<a1<a3. The distance a1 is a distance between the first bolt 10*a* that is threadably engaged with the first female thread portion 711*a* and the rotation axis P of the second pinion shaft 2. The distance a2 is a distance between the second bolt 10*b* that is threadably engaged with the second female thread portion 712*a* and the rotation axis P of the second pinion shaft 2. The distance a3 is a distance between the third bolt 10*c* that is threadably engaged with the third female thread portion 713*a* and the rotation axis P of the second pinion shaft 2.

Specifically, the second female thread portion 712a is formed so as to be the closest to the rotation axis P of the second pinion shaft 2.

Further, the second female thread portion 712a is formed so as to be located within an area defined by meshing component forces Q1 and Q2 of a force applied to the rack bar 1 and the second pinion shaft 2.

As a result, a force that is transmitted to the rack bar 1, the second pinion shaft 2, the first bearing 12, and the reduction gear housing 25 in the stated order can be received by the second female thread portion 712a that is formed so as to be located within the area defined by the meshing force components Q1 and Q2 of the force applied to the rack bar 1 and the second pinion shaft 2, that is, in a high-stiffness area of the reduction gear housing 25 including the first housing 6 and the second housing 7. The second female thread portion 712a is formed at a position that sandwiches the rack bar 1 and the second pinion shaft 2 to which a large force is transmitted from the rack bar 1 so as to be the closest to the rotation axis P of the second pinion shaft 2. Thus, a reduction in stiffness of the reduction gear housing 25 can be suppressed.

Figure 5:
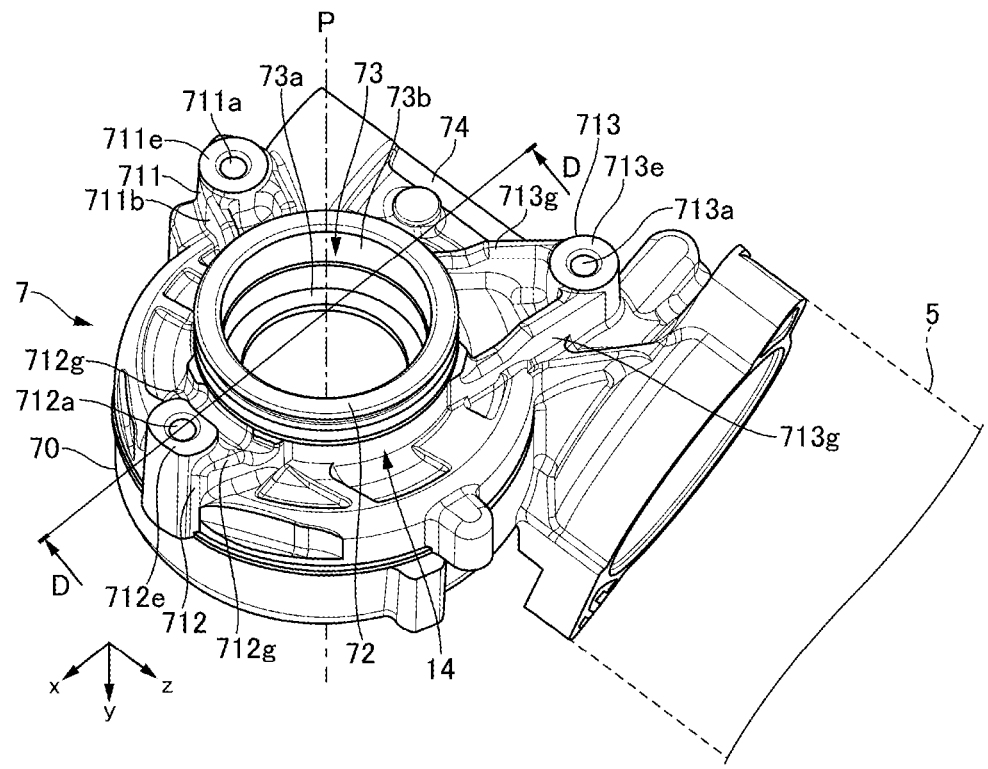
FIG. 5 is a perspective view of a second housing alone in the first embodiment when viewed from a negative side in a y-axis direction.

FIG. 5 is a perspective view of the second housing alone in the first embodiment when viewed from the negative side in the y-axis direction.

The opposed surface 712e of the second bolt boss 712 of the second housing 7 to the second bolt boss 602 of the first housing 6 is formed at a position closer to the first bearing 12 than an opposed surface 711e of the first bolt boss 711 of the second housing 7 to the first bolt boss 601 of the first housing 6 and an opposed surface 713e of the third bolt boss 713 of the second housing 7 to the third bolt boss 603 of the first housing 6. The first bearing 12 rotatably supports the second pinion shaft 2 in the first housing 6.

Specifically, the opposed surface 712e of the second bolt boss 712 of the second housing 7 to the second bolt boss 602 of the first housing 6 is formed so as to be longer in the y-axis negative direction than the opposed surface 711e of the first bolt boss 711 of the second housing 7 to the first bolt boss 601 of the first housing 6 and the opposed surface 713e of the third bolt boss 713 of the second housing 7 to the third bolt boss 603 of the first housing 6.

As a result, the first bearing 12 functions as a point of effort, and a moment arm can be reduced for a force of moment that is input to and is transmitted from the rack bar 1. Thus, the force of moment can be decreased. Accordingly, a reduction in the stiffness of the reduction gear housing 25 can be further suppressed.

Further, the first bolt boss 711, the second bolt boss 712, and the third bolt boss 713 of the second housing 7 include a pair of ribs 711g, a pair of ribs 712g, and a pair of ribs 713g, respectively. The ribs 711g, 712g, and 713g are coupled to the second bearing holding portion 73 of the second housing 7. The second bearing holding portion 73 holds the second bearing 13 that rotatably supports the second pinion shaft 2 in the second housing 7.

As a result, stiffness of the second bearing holding portion 73 of the second housing 7 can be increased to thereby suppress deformation.

Figure 6:
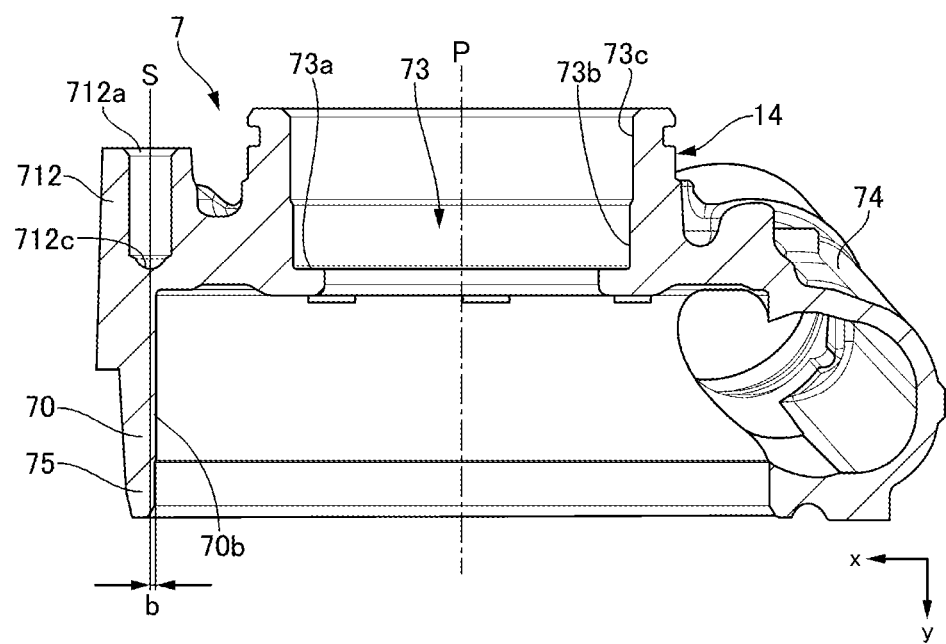
FIG. 6 is a sectional view taken along the line D-D of FIG. 5.

FIG. 6 is a sectional view taken along the line D-D of FIG. 5.

A center axis S of the second female thread portion 712a of the second bolt boss 712 that is formed so as to be the closest to the rotation axis P of the second pinion shaft 2 is offset from the inner peripheral surface 70b of the worm-wheel accommodating portion 70 to the radially outer side, specifically, in the x-axis positive direction, by a distance "b".

As a result, the lid-member fitting portion 75 can be prevented from being affected by compressive deformation of the second housing 7, which may be caused by a fastening force of the second bolt 10b. Thus, high sealing performance between the lid-member fitting portion 75 and the lid member 27 can be maintained.

Figure 7:
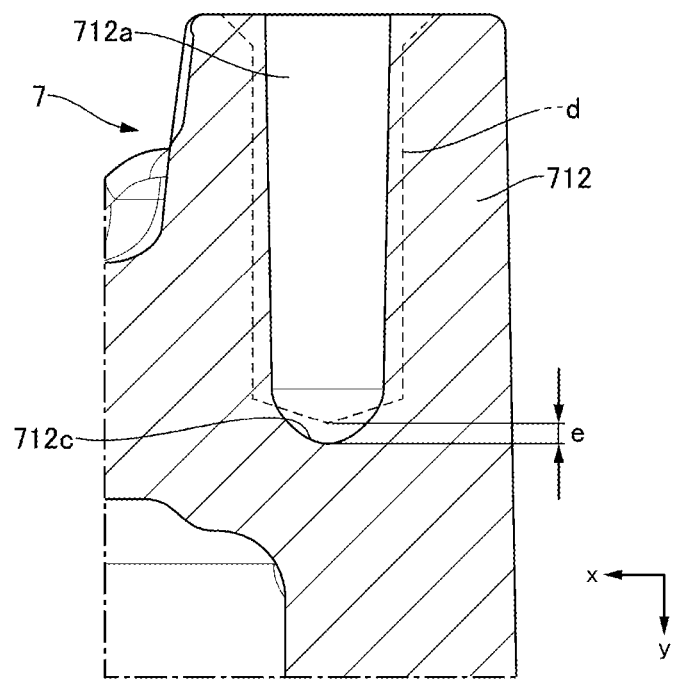
FIG. 7 is a sectional view of a second bolt boss portion of the second housing in the first embodiment.

FIG. 7 is a sectional view of the second bolt boss portion of the second housing in the first embodiment.

A roll threaded portion "d" indicated by the broken line does not reach a bottom portion 712c of the second female thread portion 712a of the second housing 7. The bottom portion 712c is formed as a remaining casting surface portion "e".

Although illustration is omitted, a bottom portion of the first female thread portion 711a and a bottom portion of the third female thread portion 713a have the same configuration.

As a result, a reduction in strength of the first female thread portion 711a, the second female thread portion 712a, and the third female thread portion 713a can be suppressed.

Next, actions and effects are described.

The electric power steering device according to the first embodiment has actions and effects listed below.

(1) The first bolt hole 601a of the first bolt boss 601 of the first housing 6 and the first female thread portion 711a of the first bolt boss 711 of the second housing 7, which are in alignment with each other in the y-axis direction, are formed so as to be located within a plane area defined by connecting the point in the first bracket hole 51a of the first bracket portion 51, the point in the second bracket hole 52a of the second bracket portion 52, and the point in the second pinion shaft 2.

Thus, a size in a radial direction can be reduced. Accordingly, the reduction gear housing 25 including the first housing 6 and the second housing 7 can be arranged in a limited small space.

(2) The first bracket portion 51 has the through holes 510a. The through holes 510a are formed at positions in alignment with the first bolt hole 601a of the first bolt boss 601 of the first housing 6 and the first female thread portion 711a of the first bolt boss 711 of the second housing 7 in the y-axis direction, specifically, at positions facing the first bolt hole 601a and the first female thread portion 711a. The first bracket portion 51 is opposed to the first bolt boss 601 and the first bolt boss 711.

Thus, the first bolt 10a, which passes through the first bolt hole 601a of the first bolt boss 601 of the first housing 6, can be easily threadably engaged with the first female thread portion 711a of the first bolt boss 711 of the second housing 7 with use of a mounting tool inserted through the through holes 510a from an outside on the negative side in the y-axis direction.

(3) The first bracket portion 51 includes two plate-shaped portions corresponding to the first plate-shaped portion 511 and the second plate-shaped portion 512 that are arranged so as to be spaced apart from each other in the y-axis direction. The first through hole 511a and the second through hole 512a, which correspond to the through holes 510a, are formed in the first plate-shaped portion 511 and the second plate-shaped portion 512, respectively.

Accordingly, the formation of a cavity in molding can be prevented.

(4) The rib 513 that couples the first plate-shaped portion 511 and the second plate-shaped portion 512 is formed at a position avoiding the first through hole 511a and the second through hole 512a.

Thus, strength of the first plate-shaped portion 511 and the second plate-shaped portion 512 can be improved, and the rib 513 and the through holes 510a can be prevented from interfering with each other.

(5) The relationship among the distance a1, the distance a2, and the distance a3 is set to: a2<a1<a3, specifically, the second female thread portion 712a is formed so as to be the closest to the rotation axis P of the second pinion shaft 2. The distance a1 is a distance between the first bolt 10a that is threadably engaged with the first female thread portion 711a and the rotation axis P of the second pinion shaft 2. The distance a2 is a distance between the second bolt 10b that is threadably engaged with the second female thread portion 712a and the rotation axis P of the second pinion shaft 2. The distance a3 is a distance between the third bolt 10c that is threadably engaged with the third female thread portion 713a and the rotation axis P of the second pinion shaft 2.

Thus, a force that is transmitted to the rack bar 1, the second pinion shaft 2, the first bearing 12, and the reduction gear housing 25 in the stated order can be received by the second female thread portion 712a, that is, in a high-stiffness area of the reduction gear housing 25 including the first housing 6 and the second housing 7. The second female thread portion 712a is formed at a position that sandwiches the rack bar 1 and the second pinion shaft 2 to which a large force is transmitted from the rack bar 1 so as to be the closest to the rotation axis P of the second pinion shaft 2. Thus, a reduction in stiffness of the reduction gear housing 25 can be suppressed.

(6) The second female thread portion 712a is formed so as to be located within an area defined by the meshing component forces Q1 and Q2 of the force applied to the rack bar 1 and the second pinion shaft 2.

Thus, a reduction in stiffness of the reduction gear housing 25 can be further suppressed.

(7) The roll threaded portion "d" indicated by the broken line does not reach the bottom portion 712c of the second female thread portion 712a of the second housing 7. The bottom portion 712c is formed as the remaining casting surface portion "e".

The bottom portion of the first female thread portion 711a and the bottom portion of the third female thread portion 713a have the same configuration.

Thus, a reduction in strength of the first female thread portion 711a, the second female thread portion 712a, and the third female thread portion 713a can be suppressed.

(8) The center axis S of the second female thread portion 712a of the second bolt boss 712 that is formed so as to be the closest to the rotation axis P of the second pinion shaft 2 is offset from the inner peripheral surface 70b of the worm-wheel accommodating portion 70 to the radially outer side, specifically, in the x-axis positive direction, by the distance "b".

Thus, the lid-member fitting portion 75 can be prevented from being affected by compressive deformation of the second housing 7, which may be caused by a fastening force of the second bolt 10b. Thus, high sealing performance between the lid-member fitting portion 75 and the lid member 27 can be maintained.

(9) The opposed surface 712e of the second bolt boss 712 of the second housing 7 to the second bolt boss 602 of the first housing 6 is formed so as to be longer in the y-axis negative direction than the opposed surface 711e of the first bolt boss 711 of the second housing 7 to the first bolt boss 601 of the first housing 6 and the opposed surface 713e of the third bolt boss 713 of the second housing 7 to the third bolt boss 603 of the first housing 6.

Thus, the first bearing 12 functions as a point of effort, and a moment arm can be reduced for a force of moment that is input to and is transmitted from the rack bar 1. Thus, the force of moment can be decreased. Accordingly, a reduction in the stiffness of the reduction gear housing 25 can be further suppressed.

OTHER EMBODIMENTS

The present invention has been described above based on the embodiment. However, the specific configuration of the present invention is not limited to the configuration described in the embodiment. A change in design without departing from the scope of the gist of the invention is encompassed in the present invention.

Technical ideas that can be understood from the above-mentioned embodiment are now described.

According to one aspect, there is provided an electric power steering device, including: a first pinion shaft to which a rotational force of a steering wheel is transmitted; a rack bar having first rack teeth to be meshed with the first pinion shaft and second rack teeth different from the first rack teeth; a second pinion shaft to be meshed with the second rack teeth; a worm wheel provided around the second pinion shaft; a worm shaft to be meshed with the worm wheel; an electric motor, which is provided to the worm shaft and is configured to generate a steering force to be applied to steered wheels; a first housing including: a rack-bar accommodating portion configured to accommodate at least a part of the rack bar; a second pinion-shaft accommodating portion configured to accommodate at least a part of the second pinion shaft; and a bracket portion including a first bracket portion and a second bracket portion, each extending outward from the rack-bar accommodating portion with respect to the rack bar, the first bracket portion having a first bracket hole configured to allow mounting to a mounted member, and the second bracket portion having a second bracket hole configured to allow mounting to the mounted member; a second housing including a worm-wheel accommodating portion configured to accommodate the worm wheel; a first bolt boss of the second housing, which is provided on the first housing side with respect to the worm-wheel accommodating portion of the second housing and has a first female thread portion, the first female thread portion being open on the first housing side and being formed so as to be located within a plane area defined by connecting the second pinion shaft, the first bracket hole, and the second bracket hole; and a first bolt boss of the first housing, which is provided to the first housing so as to be opposed to the first bolt boss of the second housing and has a first bolt hole, the first bolt hole being formed so as to be located within the plane area defined by connecting the second pinion shaft, the first bracket hole, and the second bracket hole and being formed through the first housing so as to be continuous with the first female thread portion of the first bolt boss of the second housing.

According to a more preferred aspect, in the above-mentioned aspect, the first female thread portion and the first bolt hole are arranged at positions overlapping the first bracket portion, and the first bracket portion has a through hole formed at a position facing the first female thread portion and the first bolt hole.

According to a more preferred aspect, in the above-mentioned aspect, the first bracket portion includes two plate-shaped portions, and each of the plate-shaped portions has the through hole.

According to a more preferred aspect, in the above-mentioned aspect, a rib that couples the two plate-shaped portions is arranged between the two plate-shaped portions so as to avoid the through holes.

According to still another preferred aspect, in any of the above-mentioned aspects, the second housing includes the first bolt boss, a second bolt boss having a second female thread portion, and a third bolt boss having a third female thread portion. The first housing includes the first bolt boss, a second bolt boss having a second bolt hole that is formed through the first housing so as to be continuous with the second female thread portion of the second bolt boss of the second housing, and a third bolt boss having a third bolt hole that is formed through the first housing so as to be continuous with the first female thread portion of the third bolt boss of the second housing. The second female thread portion is formed on a side opposite to the first female thread portion with respect to the second pinion shaft so as to be closer to a rotation axis of the second pinion shaft than the first female thread portion and the third female thread portion.

According to a more preferred aspect, in the above-mentioned aspect, the second female thread portion is formed so as to be located within a range defined by meshing force components of a force applied to the rack bar and the second pinion shaft.

According to still another preferred aspect, in any of the above-mentioned aspects, a casting surface is left on a bottom portion of the first female thread portion, a bottom portion of the second female thread portion, and a bottom portion of the third female thread portion.

According to still another preferred aspect, in any of the above-mentioned aspects, the second female thread portion is offset to a radially outer side from an inner peripheral surface of the worm-wheel accommodating portion of the second housing, the worm-wheel accommodating portion being configured to accommodate the worm wheel.

According to still another preferred aspect, in any of the above-mentioned aspects, an opposed surface of the second bolt boss of the second housing to the second bolt boss of the first housing is closer to a first bearing configured to rotatably support the second pinion shaft in the first housing than an opposed surface of the first bolt boss of the second housing to the first bolt boss of the first housing and an opposed surface of the third bolt boss of the second housing to the third bolt boss of the first housing.

According to still another preferred aspect, in any of the above-mentioned aspects, the second housing includes ribs configured to couple the first bolt boss, the second bolt boss, and the third bolt boss to a second bearing holding portion configured to hold a second bearing configured to rotatably support the second pinion shaft.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2020-149549 filed on Sep. 7, 2020. All disclosed contents including Specification, Scope of Claims, Drawings, and Abstract of Japanese Patent Application No. 2020-149549 filed on Sep. 7, 2020 are incorporated herein by reference in their entirety.

REFERENCE SIGNS LIST 100 electric power steering device
1 rack bar
1a first rack teeth
1b second rack teeth
12 first bearing
13 second bearing
2 second pinion shaft
23 first pinion shaft
3 worm wheel
4 worm shaft
5 electric motor
30 frame (mounted member) of vehicle
50 bracket portion
51 first bracket portion
51a first bracket hole
511 first plate-shaped portion
512 second plate-shaped portion
510a through hole
511a first through hole
512a second through hole
513 rib
52 second bracket portion
52a second bracket hole
6 first housing
63 second pinion-shaft accommodating portion
65 rack-bar accommodating portion
601 first bolt boss
601a first bolt hole
602 second bolt boss
602a second bolt hole
603 third bolt boss
603a third bolt hole
7 second housing
70 worm-wheel accommodating portion
70b inner peripheral surface of worm-wheel accommodating portion
711 first bolt boss
711a first female thread portion
711e opposed surface to first bolt boss of the first housing
711g rib
712 second bolt boss
712a second female thread portion
712c bottom portion
712e opposed surface to second bolt boss of first housing
712g rib
713 third bolt boss
713a third female thread portion
713e opposed surface to third bolt boss of first housing
713g rib
73 second bearing holding portion
P rotation axis of second pinion shaft
Q1 meshing component force of force applied to rack bar and second pinion shaft
Q2 meshing component force of force applied to rack bar and second pinion shaft

The invention claimed is:

1. An electric power steering device for applying a steering force to steered wheels, comprising:
   a first pinion shaft to which a rotational force of a steering wheel is transmitted;
   a rack bar having first rack teeth to be meshed with the first pinion shaft and second rack teeth different from the first rack teeth;
   a second pinion shaft to be meshed with the second rack teeth;
   a worm wheel provided around the second pinion shaft;
   a worm shaft to be meshed with the worm wheel;
   an electric motor, which is provided to the worm shaft and is configured to generate the steering force to be applied to the steered wheels;
   a first housing including:
      a rack-bar accommodating portion configured to accommodate at least a part of the rack bar;
      a second pinion-shaft accommodating portion configured to accommodate at least a part of the second pinion shaft; and
      a bracket portion including a first bracket portion and a second bracket portion, each extending outward from the rack-bar accommodating portion with respect to the rack bar, the first bracket portion having a first bracket hole configured to allow mounting to a mounted member, and the second bracket portion having a second bracket hole configured to allow mounting to the mounted member;
   a second housing including a worm-wheel accommodating portion configured to accommodate the worm wheel;
   a first bolt boss of the second housing, which is provided on the first housing side with respect to the worm-wheel accommodating portion of the second housing and has a first female thread portion, the first female thread portion being open on the first housing side and being formed so as to be located within a plane area defined by connecting the second pinion shaft, the first bracket hole, and the second bracket hole; and
   a first bolt boss of the first housing, which is provided to the first housing so as to be opposed to the first bolt boss of the second housing and has a first bolt hole, the first bolt hole being formed so as to be located within the plane area defined by connecting the second pinion shaft, the first bracket hole, and the second bracket hole and being formed through the first housing so as to be continuous with the first female thread portion of the first bolt boss of the second housing.

2. The electric power steering device according to claim 1,
   wherein the first female thread portion and the first bolt hole are arranged at positions overlapping the first bracket portion, and
   wherein the first bracket portion has a through hole formed at a position facing the first female thread portion and the first bolt hole.

3. The electric power steering device according to claim 2, wherein the first bracket portion includes two plate-shaped portions, and each of the plate-shaped portions has the through hole.

4. The electric power steering device according to claim 3, wherein a rib that couples the two plate-shaped portions is arranged between the two plate-shaped portions so as to avoid the through holes.

5. The electric power steering device according to claim 2,
   wherein the second housing includes the first bolt boss of the second housing, a second bolt boss of the second housing, the second bolt boss having a second female thread portion, and a third bolt boss of the second housing, the third bolt boss having a third female thread portion,
   wherein the first housing includes the first bolt boss of the first housing, a second bolt boss of the first housing, the second bolt boss having a second bolt hole that is formed through the first housing so as to be continuous with the second female thread portion of the second bolt boss of the second housing, and a third bolt boss of the first housing, the third bolt boss having a third bolt hole that is formed through the first housing so as to be continuous with the first female thread portion of the third bolt boss of the second housing, and
   wherein the second female thread portion is formed on a side opposite to the first female thread portion with respect to the second pinion shaft so as to be closer to a rotation axis of the second pinion shaft than the first female thread portion and the third female thread portion.

6. The electric power steering device according to claim 5, wherein the second female thread portion is formed so as to be located within a range defined by meshing force components of a force applied to the rack bar and the second pinion shaft.

7. The electric power steering device according to claim 5, wherein a casting surface is left on a bottom portion of the first female thread portion, a bottom portion of the second female thread portion, and a bottom portion of the third female thread portion.

8. The electric power steering device according to claim 5, wherein the second female thread portion is offset to a radially outer side from an inner peripheral surface of the worm-wheel accommodating portion of the second housing, the worm-wheel accommodating portion being configured to accommodate the worm wheel.

9. The electric power steering device according to claim 5, wherein an opposed surface of the second bolt boss of the second housing to the second bolt boss of the first housing is closer to a first bearing configured to rotatably support the second pinion shaft in the first housing than an opposed surface of the first bolt boss of the second housing to the first bolt boss of the first housing and an opposed surface of the third bolt boss of the second housing to the third bolt boss of the first housing.

10. The electric power steering device according to claim 5, wherein the second housing includes ribs configured to couple the first bolt boss of the second housing, the second bolt boss of the second housing, and the third bolt boss of the second housing to a second bearing holding portion configured to hold a second bearing configured to rotatably support the second pinion shaft.

* * * * *